(12) United States Patent
Kuwabara

(10) Patent No.: US 10,852,245 B2
(45) Date of Patent: Dec. 1, 2020

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Nobuaki Kuwabara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/572,175

(22) Filed: Sep. 16, 2019

(65) Prior Publication Data
US 2020/0103353 A1   Apr. 2, 2020

(30) Foreign Application Priority Data

Sep. 27, 2018   (JP) .................. 2018-182087

(51) Int. Cl.
| | |
|---|---|
| *G01N 21/88* | (2006.01) |
| *G06T 7/00* | (2017.01) |
| *G06T 11/20* | (2006.01) |

(52) U.S. Cl.
CPC ....... *G01N 21/8851* (2013.01); *G06T 7/0002* (2013.01); *G06T 11/203* (2013.01); *G01N 2021/888* (2013.01); *G01N 2021/8864* (2013.01); *G01N 2021/8887* (2013.01)

(58) Field of Classification Search
CPC .............. G01N 21/8851; G01N 21/88; G01N 2021/8858; G01N 2021/8861; G06T 7/0002; G06T 2207/30132
See application file for complete search history.

(56) References Cited

U.S. PATENT DOCUMENTS

| | | | | |
|---|---|---|---|---|
| 8,090,204 B2* | 1/2012 | Golan | .................. | G06K 9/4604 |
| | | | | 382/194 |
| 2008/0247636 A1* | 10/2008 | Davis | ...................... | G06T 19/00 |
| | | | | 382/152 |
| 2018/0068200 A1* | 3/2018 | Nonaka | .................. | G06T 7/0008 |
| 2018/0156736 A1* | 6/2018 | Kondo | .............. | G01N 21/8851 |
| 2018/0293725 A1* | 10/2018 | Ohshima | ................ | G01B 11/30 |
| 2018/0308230 A1* | 10/2018 | Karube | .................. | G01N 21/88 |

FOREIGN PATENT DOCUMENTS

| | | |
|---|---|---|
| JP | 2000-002523 A | 1/2000 |
| WO | 2017/103982 A1 | 6/2017 |

* cited by examiner

*Primary Examiner* — Steven Whitesell Gordon
(74) *Attorney, Agent, or Firm* — Canon U.S.A, Inc. IP Division

(57) ABSTRACT

An apparatus displays a plurality of lines representing a plurality of cracks occurring in a structure on a display unit, accepts an instruction to change a display state of the plurality of lines on the display unit, assigns order in which the display state is changed based on the instruction to each of a plurality of lines constituting one connecting point among the plurality of lines, and changes the display state of each of the plurality of lines constituting the one connecting point based on the order assigned by the assignment unit in response to acceptance of the instruction.

20 Claims, 17 Drawing Sheets

FIG.2A

| LINE ID | CONTROL POINTS | DISPLAY STATE |
|---|---|---|
| L1 | (25,12),(35,18),(36,25),(31,44),(53,59) | SOLID LINE |
| L2 | (35,18),(42,15),(43,9),(52,5) | SOLID LINE |
| L3 | (21,26),(22,18),(18,16),(19,12) | SOLID LINE |
| L4 | (21,26),(13,28),(10,21) | SOLID LINE |
| L5 | (36,25),(21,26),(12,33) | SOLID LINE |
| L6 | (10,46),(14,56),(16,62),(20,60) | SOLID LINE |
| L7 | (21,50),(34,50),(31,44),(61,44) | SOLID LINE |

FIG.2B

| LINE ID | CONTROL POINTS | DISPLAY STATE |
|---|---|---|
| L1 | (25,12),(35,18),(36,25),(31,44),(53,59) | SOLID LINE |
| L2 | (35,18),(42,15),(43,9),(52,5) | SOLID LINE |
| L3 | (21,26),(22,18),(18,16),(19,12) | SOLID LINE |
| L4 | (21,26),(13,28),(10,21) | SOLID LINE |
| L5 | (36,25),(21,26),(12,33) | THICK SOLID LINE |
| L6 | (10,46),(14,56),(16,62),(20,60) | SOLID LINE |
| L7 | (21,50),(34,50),(31,44),(61,44) | SOLID LINE |

FIG.4

| | CONNECTING POINT ID | CONNECTING LINES |
|---|---|---|
| 401 | C1 | [L1,L2] |
| 402 | C2 | [L1,L5] |
| 403 | C3 | [L1,L7] |
| 404 | C4 | [L3,L4,L5] |

(405 above "CONNECTING POINT ID", 406 above "CONNECTING LINES")

FIG.5A

| LINE ID (508) | ORDER (509) |
|---|---|
| L1 (501) | 1 |
| L2 (502) | 1 |
| L3 (503) | 1 |
| L4 (504) | 1 |
| L5 (505) | 1 |
| L6 (506) | 1 |
| L7 (507) | 1 |

FIG.5B

| LINE ID (508) | ORDER (509) |
|---|---|
| L1 (501) | 2 |
| L2 (502) | 1 |
| L3 (503) | 3 |
| L4 (504) | 4 |
| L5 (505) | 1 |
| L6 (506) | 1 |
| L7 (507) | 1 |

FIG.5C

| LINE ID (508) | ORDER (509) |
|---|---|
| L1 (501) | Null |
| L2 (502) | Null |
| L3 (503) | Null |
| L4 (504) | Null |
| L5 (505) | Null |
| L6 (506) | Null |
| L7 (507) | Null |

FIG.5D

| LINE ID (508) | ORDER (509) |
|---|---|
| L1 (501) | 1 |
| L2 (502) | 2 |
| L3 (503) | 1 |
| L4 (504) | 3 |
| L5 (505) | 2 |
| L6 (506) | 1 |
| L7 (507) | 2 |

FIG.6A

| LINE ID (508) | ORDER (509) |
|---|---|
| L1 | 2 |
| L2 | 1 |
| L3 | 1 |
| L4 | 2 |
| L5 | 3 |
| L6 | 1 |
| L7 | 1 |

FIG.6B

| LINE ID (508) | ORDER (509) |
|---|---|
| L1 | 1 |
| L2 | 2 |
| L3 | 1 |
| L4 | 2 |
| L5 | 1 |
| L6 | 1 |
| L7 | 2 |

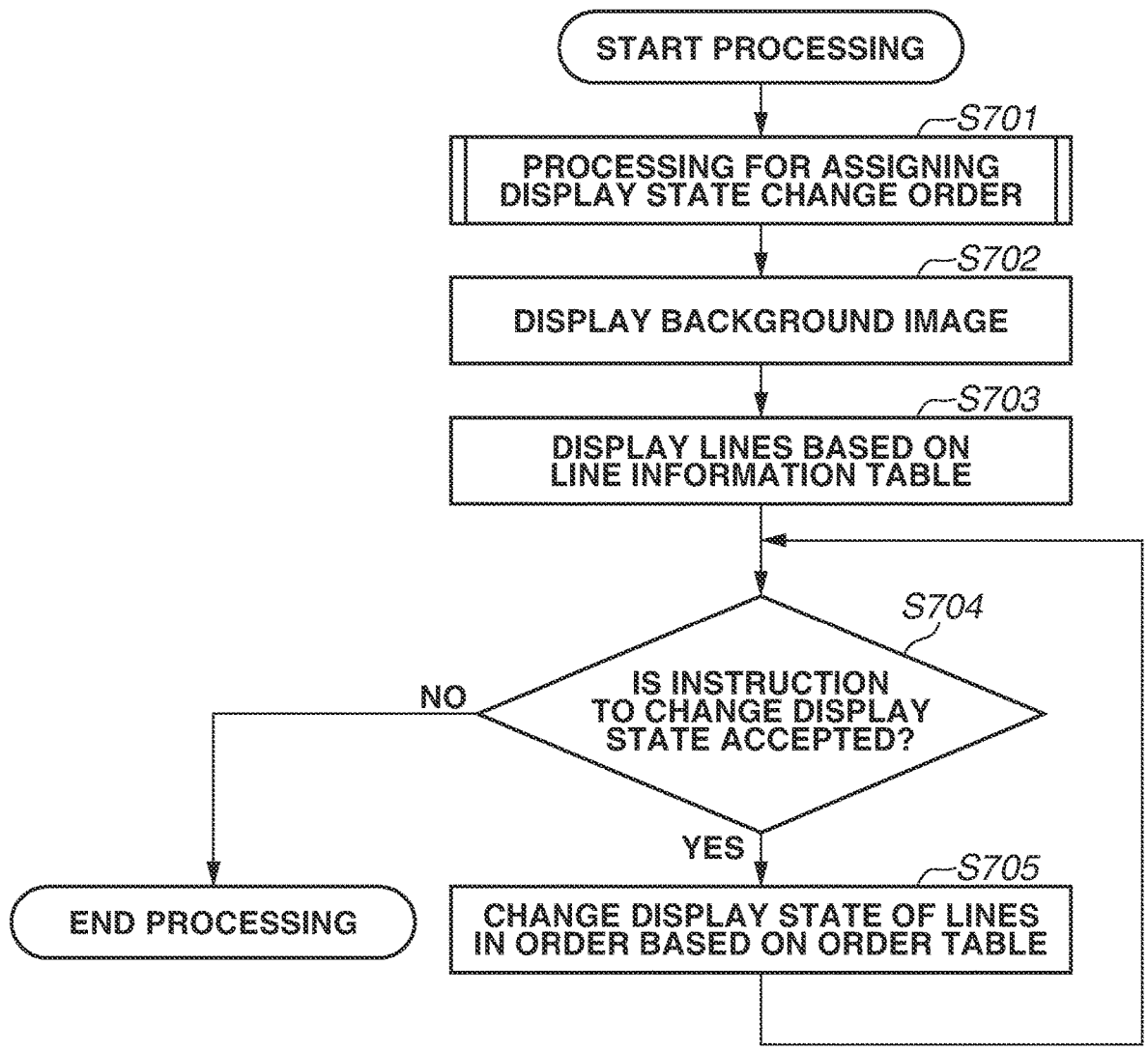

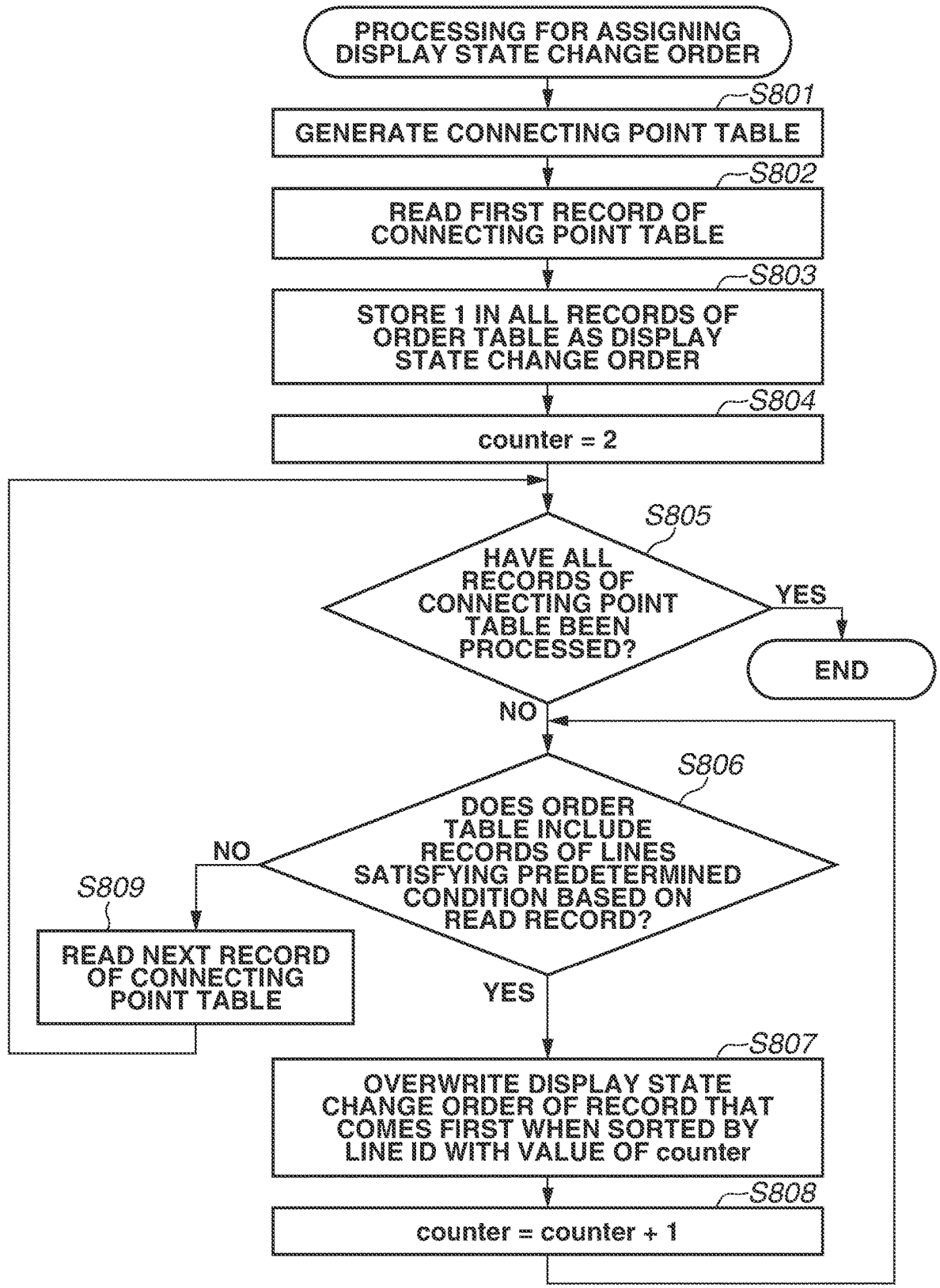

FIG.11A

| LINE ID | CONNECTING LINE LIST |
|---|---|
| L1 | [L2,L5,L7] |
| L2 | [L1] |
| L3 | [L4,L5] |
| L4 | [L3,L5] |
| L5 | [L1,L3,L4] |
| L6 | [] |
| L7 | [L1] |

FIG.11B

| LINE ID | CONNECTING LINE LIST |
|---|---|
| L1 | [L2,L7] |
| L2 | [L1] |
| L3 | [L4] |
| L4 | [L3] |
| L5 | [] |
| L6 | [] |
| L7 | [L1] |

INFORMATION PROCESSING APPARATUS, INFORMATION PROCESSING METHOD, AND STORAGE MEDIUM

BACKGROUND

Field of the Disclosure

The present disclosure relates to a technique for displaying lines expressing a defect occurring in a structure.

Description of the Related Art

Techniques for inspecting a change of a structure over time have been demanded in recent years due to the need for structure maintenance and management. Japanese Patent Application Laid-Open No. 2000-002523 discusses a technique for automatically detecting cracks from a captured image of the appearance of a structure, and extracting the shape of the cracks as lines.

The automatic detection result of the cracks can include errors in the connection state (the branch state) of lines. An error in the connection state of lines refers to misidentification of a crack continuous across a connecting point with a crack ending at the connecting point. Such misidentification of line connection hinders correct recording and observation of the cracks. A human operator then needs to check the automatic detection result of the cracks for errors in the line connection. However, a technique for making more efficient the operation for checking errors in the line connection has not been established heretofore.

SUMMARY

According to an aspect of some embodiments, an apparatus includes a display control unit configured to display a plurality of lines representing a plurality of cracks occurring in a structure on a display unit, an acceptance unit configured to accept an instruction to change a display state of the plurality of lines on the display unit, and an assignment unit configured to assign order in which the display state is changed based on the instruction to each of a plurality of lines constituting one connecting point among the plurality of lines, wherein the display control unit is configured to perform control to change the display state of each of the plurality of lines constituting the one connecting point based on the order assigned by the assignment unit in response to acceptance of the instruction by the acceptance unit.

Further features of various embodiments will become apparent from the following description of exemplary embodiments with reference to the attached drawings.

BRIEF DESCRIPTION OF THE DRAWINGS

FIGS. 2A and 2B are diagrams illustrating examples of a line information table stored in a line information storage unit.

FIG. 4 is a diagram illustrating an example of a connecting point table.

FIGS. 5A, 5B, 5C, and 5D are diagrams illustrating examples of an order table for managing a display state change order.

FIGS. 6A and 6B are diagrams illustrating examples of the order table for managing the display state change order.

FIG. 7 is a flowchart illustrating an example of processing performed by the information processing apparatus.

FIG. 8 is a flowchart illustrating an example of processing for assigning the display state change order.

FIGS. 11A and 11B are diagrams illustrating examples of a connecting line table.

DESCRIPTION OF THE EMBODIMENTS

Figure 1A:
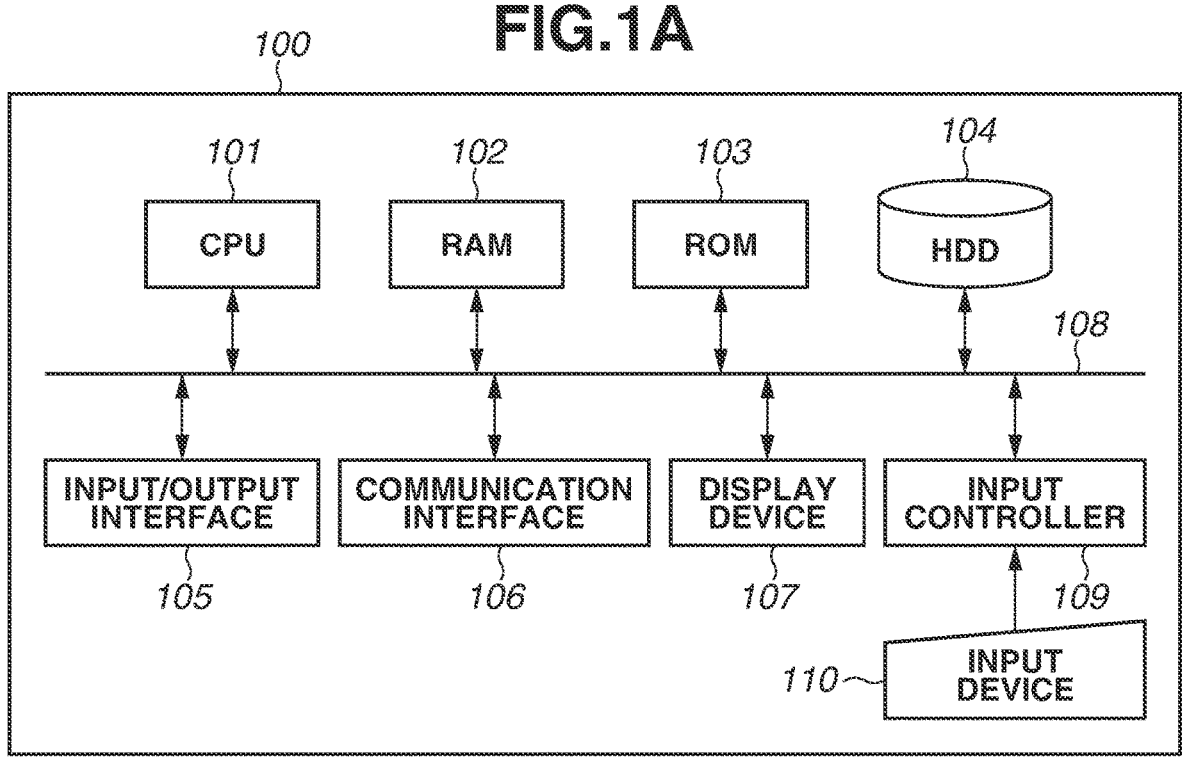
FIGS. 1A and 1B are block diagrams illustrating an example of a hardware configuration and a functional configuration of an information processing apparatus.

Exemplary embodiments will be described in detail below with reference to the drawings. The configurations described in the following exemplary embodiments are representative examples, and various embodiments are not necessarily limited to such specific configurations.

A first exemplary embodiment provides an interface for assisting human operations for checking a state of a plurality of lines expressing the shape of cracks occurring in a structure, or the state of connecting portions (branch portions of cracks) in particular. The plurality of lines expressing the shape of cracks is obtained as a result of automatic detection from a captured image of the appearance of the structure. The lines can also be obtained by the human (user), who is an inspector of the structure, tracing cracks on the captured image of the structure. Even in the operations where the user traces the cracks, errors can occur depending on the skills and the degree of fatigue of each user. The present exemplary embodiment is applicable to the case of checking such errors. Examples of the operations to be assisted in the present exemplary embodiment include one for checking the presence or absence of misidentification of a crack continuous across a connecting point with a crack ending at the connecting point. The state of drawing data on a plurality of lines connecting or overlapping at a plurality of points has conventionally been checked by a method such as follows: Using ordinary drawing software or computer-aided design (CAD) software, select a plurality of lines related to a connecting point on a line of interest into a selected state one by one with a pointing device such as a mouse. The display state of the lines in the selected state is changed so that the lines can be easily distinguished from the other lines. The change in the display state of the lines enables the user to determine whether the lines are continuous or discontinuous across the connecting point. The ease of identification of each line is also attempted to be improved, for example, by displaying all the lines in different colors.

The detection result can include a large number of cracks in the structure, depending on various factors such as the size of the structure. In such a case, the conventional operation of selecting and checking lines representing cracks one by one with a pointing device, such as mouse, takes a long time. It is also practically difficult to assign easily identifiable different colors to the respective large number of lines. The detection result of cracks includes not only the positions and shapes of the cracks but also various types of additional information, such as widths and degrees of extension at respective observation points. There has thus been a demand to use line colors and thicknesses to express such additional information. The present exemplary embodiment provides an interface for making more efficient the operations for checking the state of a plurality of lines around a point where the lines connect, compared to the conventional method of selecting lines representing cracks one by one by using a pointing device.

FIG. 1A is a block diagram illustrating a hardware configuration of an information processing apparatus 100 according to the present exemplary embodiment. The information processing apparatus 100 includes a central processing unit (CPU) 101, a random access memory (RAM) 102, a read-only memory 103, a hard disk drive (HDD) 104, an input/output interface 105, a communication interface 106, a display device 107, a bus 108, an input controller 109, and an input device 110.

The CPU 101 executes and controls various functions of the information processing apparatus 100. The RAM 102 temporarily stores programs and data supplied from an external apparatus. The ROM 103 stores programs and various parameters that do not need to be changed. The display device 107 functions as a display unit for displaying graphics drawn by the CPU 101. The HDD 104 stores various types of information. The input/output interface 105 inputs and outputs control signals for transmitting and receiving data to/from external devices. The communication interface 106 is a device for connecting to a network and performs data transmission and reception with external devices via the network. The HDD 104 may be replaced with an external storage device connected via the input/output interface 105 or the communication interface 106. The bus 108 is a system bus and connects the CPU 101, the RAM 102, the ROM 103, the HDD 104, the input/output interface 105, the communication interface 106, the display device 107, and the input controller 109. The input controller 109 is a controller for controlling an input signal from the input device 110. The input device 110 is an external input device for accepting operation instructions from a user. Examples of the input device 110 include a keyboard and a mouse.

Figure 1B:
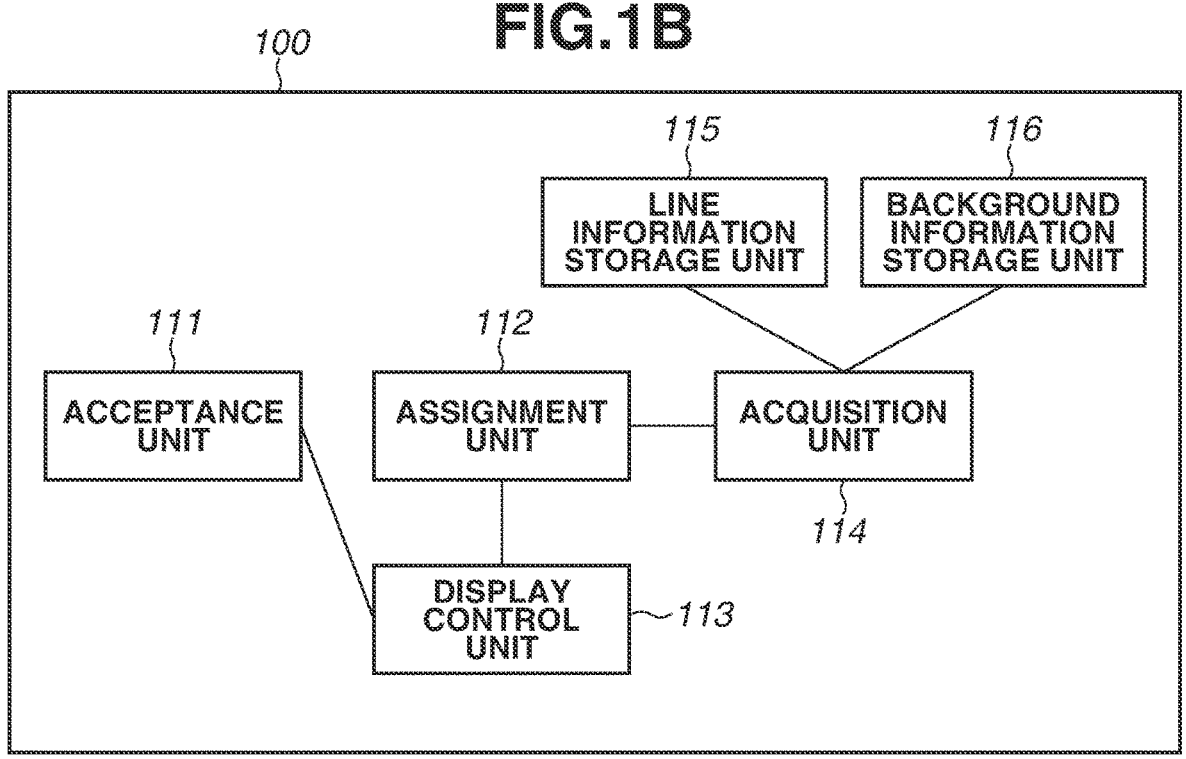

FIG. 1B is an example of a block diagram illustrating a software configuration of the information processing apparatus 100 according to the present exemplary embodiment. The information processing apparatus 100 includes an acceptance unit 111, an assignment unit 112, a display control unit 113, and an acquisition unit 114. Such functional units are implemented by the CPU 101 loading programs stored in the ROM 103 into the RAM 102 and executing processing to be described below. If, for example, hardware is configured as an alternative to the software processing using the CPU 101, arithmetic units and circuits corresponding to the processing of the respective functional units described here may be configured. The information processing apparatus 100 further includes a line information storage unit 115 and a background image storage unit 116, which are functional units of the HDD 104 or the RAM 102. Each component will be described below.

The acceptance unit 111 is a functional unit of the CPU 101. The acceptance unit 111 accepts instructions that are input to the information processing apparatus 100 by the user operating the input device 110. In the present exemplary embodiment, the acceptance unit 111 accepts instructions to change a display state of a plurality of lines defined to express at least a defect occurring in a structure on the display device 107. In the present exemplary embodiment, a defect occurring in a structure, expressed by a plurality of lines, refers to "cracks" in particular.

The assignment unit 112 assigns order in which the display state is changed based on instructions accepted by the acceptance unit 111 (display state change order) to each of a plurality of lines representing a plurality of cracks occurring in the structure. Specifically, in the present exemplary embodiment, each of a plurality of lines constituting a connecting point among the plurality of lines is assigned a different order. As a result, the display state of each of the plurality of lines constituting a connecting point is changed at different timings based on instructions accepted by the acceptance unit 111. If a line is connected to other lines at a plurality of connecting points, the display state change order is assigned so that the display state of the line is changed at a timing different from that of other lines at each connecting point. In the present exemplary embodiment, the assignment unit 112 generates an order table, which is described below, and manages correspondence between lines to be uniquely identified and the order assigned to the lines.

The display control unit 113 controls display on the display device 107 by generating and outputting a display image. In the present exemplary embodiment, if the acceptance unit 111 accepts an instruction to change the display state of a plurality of lines expressing a plurality of cracks occurring in a structure, the display control unit 113 changes the display state of at least part of the plurality of lines based on the order assigned by the assignment unit 112. For example, the display control unit 113 outputs to the display device 107 such a display image that each time an instruction is accepted, solid lines change into dotted lines in order from the lines to which earlier order is assigned. The display control unit 113 performs control to start and end displaying the image on the display device 107 and change the display based on the user's instructions accepted by the acceptance unit 111.

The acquisition unit 114 acquires information stored in the line information storage unit 115 and the background image storage unit 116, and supplies the information to the assignment unit 112 and the display control unit 113. The line information storage unit 115 stores information about the plurality of lines defined to express the defect occurring in the structure in a table form. The table will hereinafter be referred to as a line information table. In the present exemplary embodiment, the information about the lines stored in the line information storage unit 115 is information about lines that are generated by analyzing a captured image of the structure and automatically detecting cracks. The user who is the inspector of the structure may trace the cracks in the structure, and the resulting lines may be included in the line information table. The background image storage unit 116 stores a background image to be displayed on the display device 107 along with the plurality of lines. In the present exemplary embodiment, the background image is the captured image of the structure or an image obtained by applying image processing, such as transformation and stitching, to the captured image. Examples of the background image include a photograph of concrete of the structure.

Figure 3A:
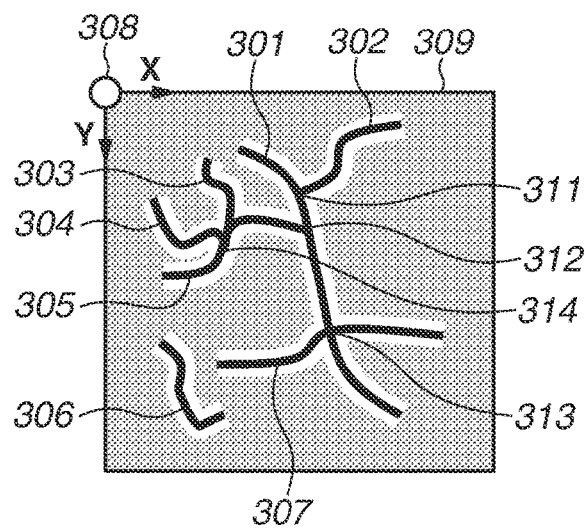
FIGS. 3A, 3B, 3C, and 3D are diagrams illustrating examples of a background image and lines displayed.

Next, modes of a plurality of lines displayed based on line information stored in the line information storage unit 115 according to the present exemplary embodiment will be described with reference to FIGS. 2A to 5D. FIGS. 2A and 2B are diagrams illustrating line information in a table format (line information table) that the line information storage unit 115 stores in the present exemplary embodiment and a modification of a second exemplary embodiment to be described below, respectively. FIG. 3A is a diagram illustrating a two-dimensional spatial representation of the line information stored in the line information storage unit 115 according to the present exemplary embodiment.

In the line information tables illustrated in FIGS. 2A and 2B, a column 208 stores information about a line identifier (ID), a column 209 control points, and a column 210 a display state. Each record of the line information tables corresponds to a line. The line information table illustrated in FIG. 2A includes records 201 to 207 corresponding to information about seven lines. Lines 301 to 307 in FIG. 3A correspond to the drawing results of the information about the records 201 to 207, respectively.

In the line information tables, the line ID column 208 stores characters, numerical values, or combinations of a character "L" and numerical values that can uniquely identify the lines stored in the line information tables. In the present exemplary embodiment, the line IDs are expressed by using combinations of the character "L" and numerical values. The control point column 209 stores coordinates of control points constituting each line. In the present exemplary embodiment, a line is expressed by a spline curve defined by control points. The present exemplary embodiment is not limited to such a line expression method. For example, straight lines may be used to express lines between control points.

The control points (column 209) in the line information tables will be further described by using information about a line L1 in a record 201 as an example. A group of points stored in the column 209 for the line L1 in the record 201 corresponds to a plurality of control points of a line 301 in FIGS. 3A, 3C, and 3D. The parenthesized numerals indicate the values of XY coordinates in the coordinate system with a point 308 in FIG. 3A to 3D as the point of origin. For example, (25, 12) indicate that a control point of the line is located at an X coordinate of 25 and a Y coordinate of 12. The information about the line L1 in the record 201 includes the coordinates of five control points in the column 209. Among the lines illustrated in FIGS. 3A, 3C, and 3D, the line 301 corresponding to the record 201 is the line having the five control points stored in the column 209 of the record 201.

Figure 3B:
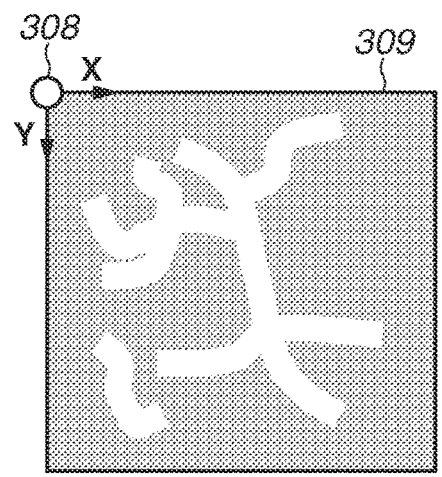
Figure 3C:
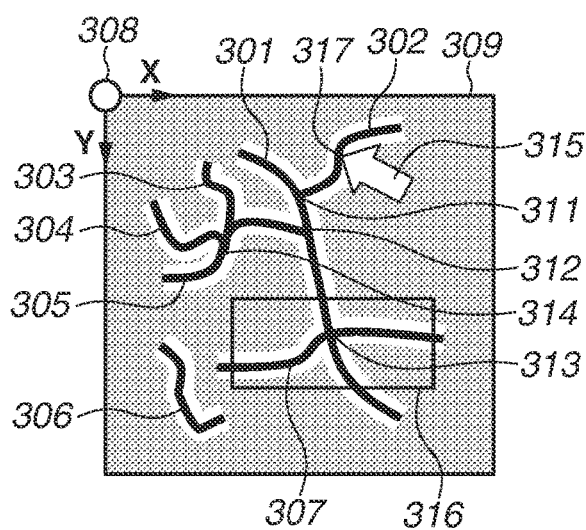
Figure 3D:
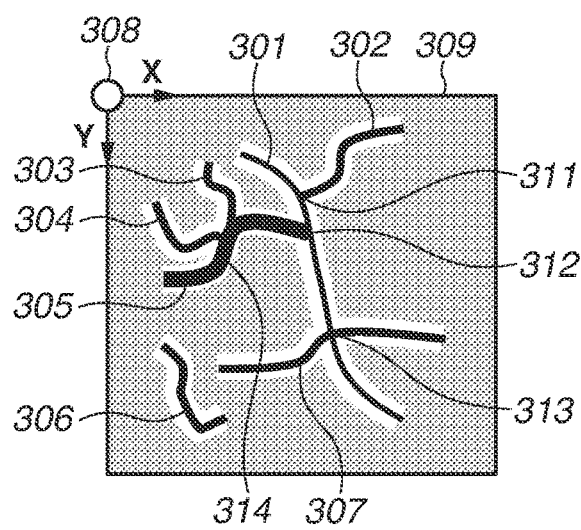

The display state column 210 stores information about the display state of the lines. For example, the display state in the record 201 is a solid line. The corresponding line 301 in FIGS. 3A, 3C, and 3D is displayed as a solid line.

In the present exemplary embodiment, the information about the plurality of lines stored in the line information table expresses a plurality of cracks occurring in the structure. In particular, the information is about lines that are generated by analyzing the captured image of the structure stored as the background image in the background image storage unit 116 and automatically detecting cracks. Since methods for detecting cracks (lines) from an image are commonly known, a description thereof will be omitted. The information may be about lines that the user who is the inspector of the structure has generated by inputting control points, using a pointing device such as a mouse.

Next, details of the processing for assigning the display state change order to a plurality of lines will be described. The assignment unit 112 according to the present exemplary embodiment initially refers to the line information table, and generates a table containing information about connecting points formed by connection of lines by using the information. The resulting table will hereinafter be referred to as a connecting point table.

FIG. 4 is a diagram illustrating an example of the connecting point table generated by the assignment unit 112. In the connecting point table, a column 405 stores information about connecting point IDs, and a column 406 stores information about connecting lines. Each record of the connecting point table represents a connecting point where lines connect to each other. Connecting points in records 401 to 404 of the connecting point table correspond to the connecting points 311 to 314, respectively, in FIGS. 3A, 3C, and 3D.

The connecting point ID column 405 stores characters, numerical values, or combinations of a character and numerical values that can uniquely identify the connecting points of lines stored in the connecting point table. In the present exemplary embodiment, combinations of the character "C" and numerical values are used. A column 406 stores the line IDs of a plurality of lines connecting to each other at the connecting point of each record in a list form. For example, the record 401 indicates that the lines having line IDs of "L1" and "L2" connect to each other at the connecting point C1. The record 401 corresponds to the connecting point 311 in FIGS. 3A, 3C, and 3D. The line with the line ID of "L1" corresponds to the line 301 in FIGS. 3A, 3C, and 3D, and the line with the line ID of "L2" corresponds to the line 302.

The assignment unit 112 assigns the display state change order to each of the plurality of lines, and outputs the resulting display state change order to the display control unit 113. In the present exemplary embodiment, the display state change order assigned to each of the plurality of lines is managed by using a table. FIGS. 5A to 5D are diagrams illustrating examples of an order table for managing the display state change order. In the order table, a column 508 stores the line IDs, and a column 509 the order (display state change order). Each record of the order table indicates a correspondence between a line and the display state change order assigned to the line. The line ID column 508 stores the line IDs stored in the column 208 of the line information table. Records 501 to 507 in the order tables of FIGS. 5A to 5D correspond to the records 201 to 207 of the line information table in FIG. 2A, respectively. For the information about the order (column 509), numerical values indicating the display state change order assigned to the lines of the respective records are stored. By using the connecting point table and the order table, the assignment unit 112 assigns an order, to each of a plurality of lines constituting a connecting point, to change a timing at which the display state is changed based on an instruction to change the display state. A method for calculating the order to change the display state of the lines will be described below with reference to a flowchart.

In the present exemplary embodiment, the display control unit 113 displays the lines of the line information table stored in the line information storage unit 115 on the display device 107 as superimposed on the background image read from the background image storage unit 116. FIG. 3B is a diagram illustrating an example of the background image obtained from the background image storage unit 116. A background image 309 is a captured image (photograph) of the concrete of the structure. The pattern seen on the background image 309 shows cracks occurring in the structure. It will be understood that the present exemplary embodiment is also applicable to members other than a concrete member of the structure, and the types of background images are not limited.

In the present exemplary embodiment, the information about the plurality of lines stored in the line information table is generated by analyzing the background image 309 and automatically detecting cracks (lines). As illustrated in FIG. 3A, the display control unit 113 refers to the line information table and displays the lines 301 to 307 on the display device 107 as superimposed on the background image 309. If the acceptance unit 111 accepts an instruction to change the display state of the lines, the display control unit 113 reads the order table for managing the display state change order of the lines assigned by the assignment unit 112. The display control unit 113 then changes the display state of each of the plurality of lines stored in the line information table and displays the result based on the order defined in the order table. Specifically, the display control unit 113 initially changes the display state of a line or lines to which the earliest display state change order is assigned. Each time the acceptance unit 111 accepts the same instruction, the display control unit 113 successively changes the display state of a line or lines to which the next display state change order is assigned. A plurality of lines not contacting each other at a connecting point can be assigned a display state change order such that their display state is changed at the same timing. That is, the lines to change the display state of when the acceptance unit 111 accepts an instruction to change the display state of the lines may be at least part of the plurality of lines and not necessarily limited to one in number. In other words, the assignment unit 112 according to the present exemplary embodiment groups the plurality of lines expressing a defect occurring in the structure so that a plurality of lines making contact at a connecting point belong to respective different groups. In the present exemplary embodiment, the plurality of groups generated by the assignment unit 112 corresponds to respective different display state change orders. Details of gradual changes in the display state based on the display state change order will be described below.

Next, a processing procedure of the information processing apparatus 100 according to the present exemplary embodiment will be described with reference to the flowcharts of FIGS. 7 and 8.

FIG. 7 is a flowchart illustrating an example of main processing performed by the information processing apparatus 100 according to the present exemplary embodiment. In S701, the assignment unit 112 assigns a display state change order to each of the plurality of lines to be displayed. Details of the processing for assigning the display state change order in S701 will be described below with reference to the flowchart of FIG. 8.

In S702, the display control unit 113 generates a display image for displaying the background image 309 read from the background image storage unit 116 by the acquisition unit 114 on the display device 107, and outputs the display image. Since the display contents will subsequently be changed, the display control unit 113 repeats updating the display image and outputting the display image to the display device 107. Such an operation will hereinafter be referred to as simply "display" the display image "on the display device 107". In S703, the display control unit 113 displays a plurality of lines drawn based on the information of the line information table read from the line information storage unit 115 by the acquisition unit 114 on the display device 107 as superimposed on the background image 309. As illustrated in FIG. 3A, the display result here includes the lines 301 to 307 superimposed on the background image 309.

In S704, the acceptance unit 111 waits for an instruction to change the display state of the lines via the input device 110. Specifically, the acceptance unit 111 determines whether an instruction to change the display state of the lines is accepted. If the acceptance unit 111 accepts an instruction to change the display state of the lines (YES in S704), the processing proceeds to S705. If an instruction other than to change the display state of the lines, such as a command to end display, is input or if a timeout occurs (NO in S704), the processing ends. In S705, the display control unit 113 reads the order table from the RAM 102 and changes the display state of the plurality of lines stored in the line information table in order and displays the lines on the display device 107 based on the order defined in the order table. The processing returns to S704.

The flowchart of FIG. 8 illustrates the processing procedure for assigning the display state change order in S701. In S801, the assignment unit 112 identifies a connection relationship between the lines by using the line information table illustrated in FIG. 2A, and generates the connecting point table illustrated in FIG. 4. Common techniques can be used to identify the connections between the lines from the information stored in the line information table. A description thereof will thus be omitted. In S802, the assignment unit 112 reads the first record of the connecting point table. For example, in the case of the connecting point table illustrated in FIG. 4, the first record corresponds to the connecting point C1 (record 401). In S803, the assignment unit 112 stores 1 in all the records of the order table as the display state change order in the column 509. FIG. 5A illustrates the order table in the state after the processing of S803. In S804, the assignment unit 112 substitutes 2 into a variable "counter" used for assignment.

In S805, the assignment unit 112 determines whether all the records of the connecting point table have been processed. If all the records of the connecting point table have been processed (YES in S805), the assignment processing ends. The processing proceeds to S702 of FIG. 7. If there is an unprocessed record in the connecting point table (NO in S805), the processing proceeds to S806. For the initial round of processing, the processing always proceeds to S806 (NO in S805).

In S806, the assignment unit 112 determines whether records of lines satisfying a predetermined condition based on the read record are included in the order table. The records satisfying the predetermined condition refer to a plurality of records that contains line IDs listed in the list (column 406) of lines connecting at the connecting point in the read record of the connecting point table and to which the same display state change order is assigned in the order table. To make such a determination, the assignment unit 112 initially refers to the line IDs stored in the column 406 of the read record of the connecting point table. The assignment unit 112 identifies the records of the order table at the point in time that contain the same line IDs in the column 508 as the referred line IDs, and the assignment unit 112 refers to the column 509 where the display state change order is stored. The assignment unit 112 then determines whether records to which the same display state change order is assigned are included. If records to which the same display state change order is assigned are included (YES in S806), the processing proceeds to S807. If no records to which the same display state change order is assigned are included (NO in S806), the processing proceeds to S809.

For example, if the first record 401 of the connecting point table illustrated in FIG. 4 is read, the line IDs stored in the column 406 are "L1" and "L2". In the order table of FIG. 5A (in the state where the display state change order is all initialized to 1 in S803), the records corresponding to the line IDs of "L1" and "L2" are the records 501 and 502. In the order table of FIG. 5A, the order (column 509) assigned to both the lines of the records 501 and 502 is 1. In such a case, the processing proceeds to S807 since the order table includes records of lines satisfying the predetermined condition based on the read record.

In S807, the assignment unit 112 identifies a record that comes first when the plurality of records having the same display state change order, determined to be the records (lines) of the order table satisfying the predetermined condition in S806, are sorted by line ID (column 508). The assignment unit 112 overwrites the display state change order (column 509) of the identified record with the value of counter. If the line IDs are numerical values, the line IDs are sorted in ascending order. If, for example, the line IDs are characters, the line IDs can be sorted in ascending order of character codes. If the line IDs are combinations of a character and numerals, the line IDs may be sorted by treating both the character and numerals as characters, or may be sorted based only on the numerical values. For example, in the order table of FIG. 5A, the records 501 and 502 satisfying the predetermined condition in S806 have line IDs of "L1" and "L2", respectively. In the present exemplary embodiment, the line ID of the record that comes first when sorted by line ID is "L1". The assignment unit 112 therefore overwrites the display state change order stored in the column 509 of the record 501 of the order table in FIG. 5A with the value of counter, 2.

In S808, the assignment unit 112 adds 1 to the current value of counter and substitutes the sum into counter. The processing returns to S806. In S806, if the order table is determined to still include records satisfying the predetermined condition after the processing of S807 (YES in S806), the processing proceeds to S807 again. On the other hand, if the order table is determined to no longer include records satisfying the predetermined condition as a result of the processing of S807 (NO in S806), the processing proceeds to S809. In S809, the assignment unit 112 reads the next record of the connecting point table. The processing proceeds to S805.

Suppose that the first record of the connecting point table illustrated in FIG. 4 is read in S802. If the display state change order stored in the column 509 of the record 501 of the order table in FIG. 5A is overwritten with 2, the predetermined condition in S806 becomes no longer satisfied. The next record 402 is then read in S809, and the determination of S806 is made again. Here, the display state change order assigned for the line IDs "L1" and "L5" stored in the column 406 of the record 402 is 2 and 1, respectively, i.e., not the same. The processing is repeated in such a manner until the record 404 is read and the connecting lines with line IDs of "L3", "L4", and "L5" are determined to satisfy the predetermined condition in S806 again. In S807, the display state change order in the record 504 with the line ID of "L3" is first overwritten with the value of counter, 3. After the counter is incremented in S808, the records with the line IDs of "L4" and "L5" still have the same display state change order (YES in S806) and the processing proceeds to S807. In S807, the display state change order in the record 504 with the line ID of "L4" is then overwritten with the value of counter, 4. FIG. 5B illustrates the order table resulting from such a series of processes.

Figure 9:
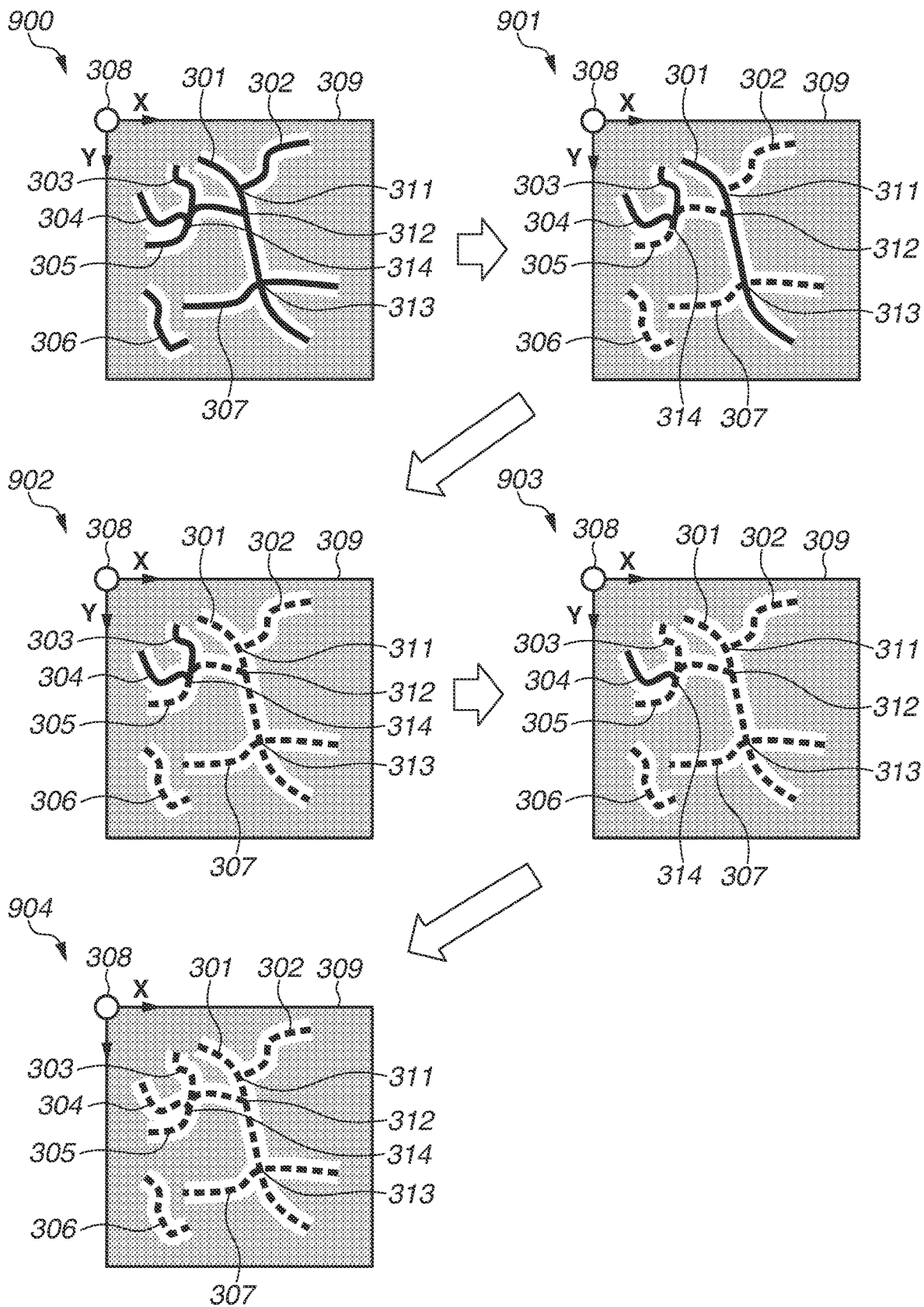
FIG. 9 is a diagram illustrating a case where the display state of lines is changed from solid lines to dotted lines based on the display state change order.

FIG. 9 is a diagram illustrating an example of how the display state of the plurality of lines is changed stepwise by the display control unit 113 based on the order table illustrated in FIG. 5B. In this example, instructions to change the display state are ones to switch the display state of lines from solid lines to dotted lines. In FIG. 9, elements similar to those described in FIGS. 3A to 3D are designated by the same reference numerals as in FIGS. 3A to 3D.

A display state 900 is the same state as that of FIG. 3A. The plurality of lines 301 to 307 is displayed on the background image 309 in a superimposed manner based on the information stored in the line information table of FIG. 2A. When the acceptance unit 111 accepts the first instruction to change the display state, the display on the display device 107 transitions from the display state 900 to a display state 901. In the display state 901, the display state of the lines 302, 305, 306, and 307 corresponding to the records of the order table of FIG. 5B containing 1 in the column 509 (the records with line IDs of "L2", "L5", "L6", and 37 L7) is changed from solid lines to dotted lines. When the acceptance unit 111 accepts the second instruction to change the display state, the display on the display device 107 transitions from the display state 901 to a display state 902. Here, the display state of the line 301 (with a line ID of "L1") corresponding to the record 501 of the order table of FIG. 5B with order of 2 is changed from a solid line to a dotted line.

In the display state 902, the change of the line 301 from a solid line to a dotted line enables the user to check the state of the lines (cracks) detected around the connecting points 311, 312, and 313 by making a comparison with the display state 901. The display state then transitions to the display state 903 and to the display state 904 each time the acceptance unit 111 accepts an instruction to change the display state. In the display state 903, the line 303 with display state change order of 3 is changed from a solid line to a dotted line. This facilitates the user checking the state of the lines around the connecting point 314. For example, if a line representing a crack that is supposed to be continuous across a connecting point changes gradually into a dotted line in a plurality of discrete steps, the detection result of cracks in that portion can be determined to be erroneous. By contrast, if a line representing a crack ending at a connecting point changes into a dotted line simultaneously with another line representing a crack, the error can be immediately identified. According to the present exemplary embodiment, the states of the connecting points can thus be checked efficiently, compared to the conventional method in which a plurality of lines resulting from crack detection is brought into a selected state one by one to determine whether the state of a connecting point or points related to the line (branch portion(s) of the crack) is correct or erroneous. This can reduce time needed for the operation for checking the connection state even when there are a large number of lines representing cracks.

In the present exemplary embodiment, the instructions to change the display state of the plurality of lines accepted by the acceptance unit 111 are input by using cursor keys of a keyboard. For example, the display state is changed based on the order table each time a right cursor key is pressed. In such a case, the display control unit 113 may perform display control to undo the change in the display state if a left cursor key is pressed. This enables the user to check the change in the display state of the lines repeatedly. Specifically, in some embodiments, if the right cursor key is pressed with the display state 901 displayed, the display transitions to the display state 902. If the left cursor key is pressed with the display state 902 displayed, the display transitions to the display state 901. In the present exemplary embodiment, if the right cursor key is pressed with the display state 904 displayed, no transition occurs in the display state and the display state 904 continues being displayed to indicate that the display state of all the lines has been changed. Alternatively, if the right cursor key is pressed with the display state 904 displayed, the display may transition to the display state 900. In other words, the display states 900 to 904 may be displayed in a looped manner. The provision of an interface thus operating enables the user to switch the display state of the lines at any timing for improved convenience. In the present exemplary embodiments, the left and right cursor keys are assigned to change the display. However, some embodiments use other key assignments. For example, up and down cursor keys may be assigned to change the display.

The display states 900 to 904 may be switched and displayed at predetermined intervals. The predetermined intervals may be settable by the user numerically inputting time to a setting item in a dialog box. For example, if the predetermined intervals are set to 0.5 sec, the display state 901 is displayed 0.5 sec after the display state 900 is displayed. The display states 902, 903, and 904 are then displayed at intervals of 0.5 sec. The display states 900 to 904 here may be displayed in a looped manner. Specifically, after the display states 900 up to 904 have been displayed in order, the display may return to the display state 900. Depending on the user's setting, the display may be reversed from the display state 904 to the display state 900 after the display states 900 to 904 have been displayed in order. The loop (or reverse loop) may be repeated until an end instruction is given. Such an interface can minimize the number of operation inputs, and the user can focus on visual checking operations.

Figure 10:
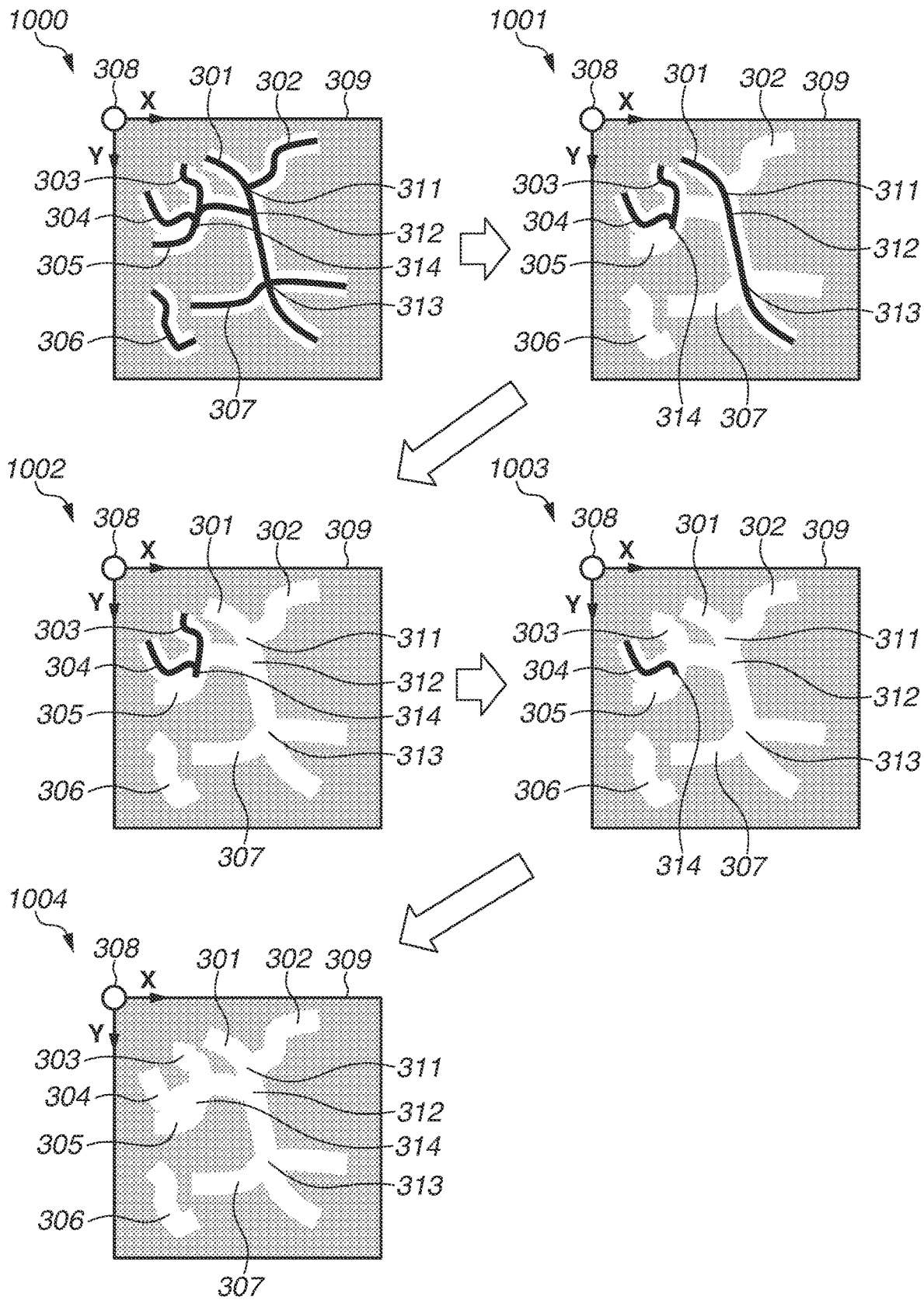
FIG. 10 is a diagram illustrating a case where the display state of lines is changed from solid lines to transparent based on the display state change order.

In the example illustrated in FIG. 9, the display state of the plurality of lines is changed from solid lines to dotted lines. However, the present exemplary embodiment is not limited thereto. For example, FIG. 10 illustrates a case where the display state of the lines is changed from solid lines to transparent lines. In FIG. 10, like FIG. 9, display states 1000 to 1004 show how the display state of the plurality of lines is changed stepwise by display control processing based on the order table of FIG. 5B. Since a plurality of lines contacting at the connecting points 311, 312, 313, and 314 is made transparent at respective different timings, the user can easily check the states of the lines around the connecting points in a short time. Making the lines transparent enables the user to refer to the background image 309 itself in the display state 1004. By referring to the background image 309, the user can observe the original state of cracks related to each of the connecting points 311, 312, 313, and 314.

As a modification, the display state of the plurality of lines can be changed by applying various methods other than in the examples illustrated in FIGS. 9 and 10. Examples includes adjusting transparency to make the lines semitransparent, changing the lines in color, changing the lines in shape, such as in thickness, and changing the layer to draw the lines on. In any case, the display state can be changed so that the user can recognize the connection state of the lines around the connecting points independently line by line.

As described above, the information processing apparatus 100 according to the present exemplary embodiment reduces the time needed for the user to check the connection state of a plurality of lines contacting at a connecting point by assigning the display state change order to the plurality of lines so that their display state is changed at different timings.

In the first exemplary embodiment, the display state change order is assigned to all the lines about which the information is stored in the line information table. However, this is not necessarily needed. For example, if the range of screen display on the display device 107 is limited to part of the entire image, the user may not have the intension to check the connection state of the lines lying outside the display range in the first place. If the user desires to intensively examine a complicated connection state of only some of the plurality of lines, the display state change order does not need to be assigned to the lines in the other areas. The display state change order also may not need to be assigned to lines not in contact with other lines among the plurality of lines, or lines of which the connection state with other lines evidently shows even without a change in display state. A first modification for narrowing down target lines before the execution of the foregoing assignment processing so that checking operations can be more efficiently performed in the foregoing cases will now be described.

Figure 17:
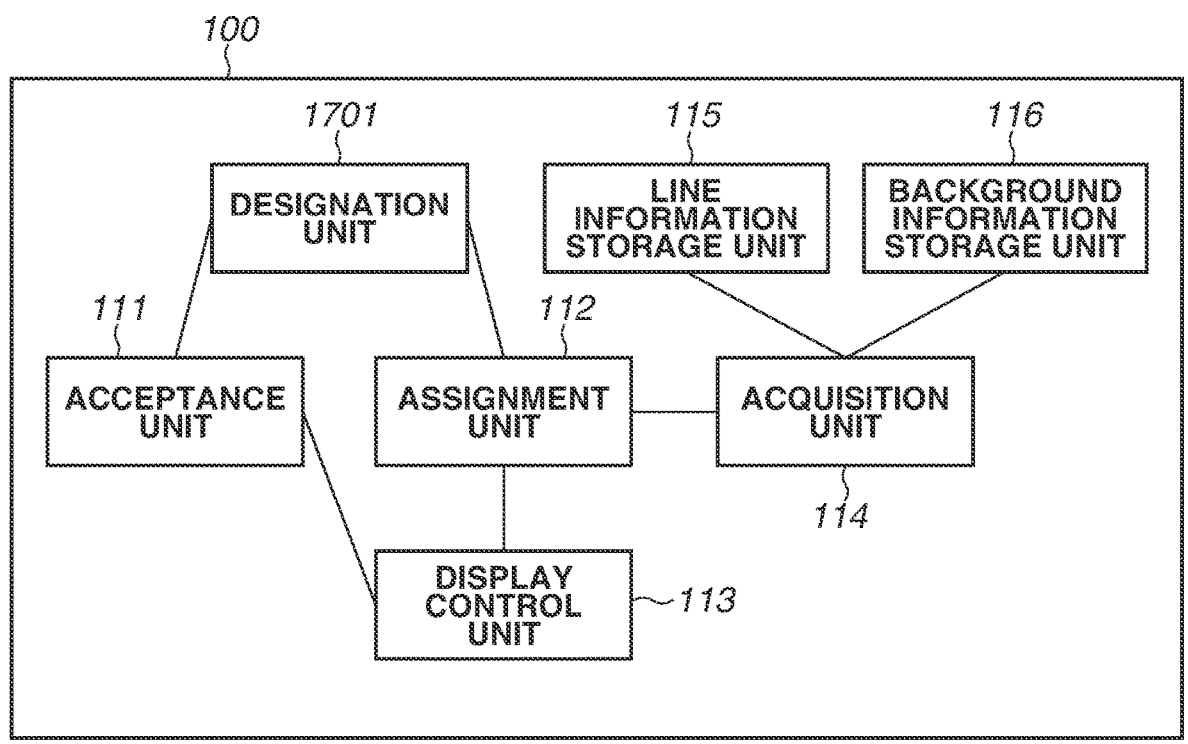
FIG. 17 is a block diagram illustrating a functional configuration of an information processing apparatus.

In the first modification, a description of similarities to what has already been described in the first exemplary embodiment will be omitted as appropriate, and differences will be described. In the drawings, elements common to those of the first exemplary embodiment are designated by the same reference numerals. FIG. 17 illustrates an example of a software configuration of an information processing apparatus 100 according to the first modification. In the first modification, the acceptance unit 111 accepts input of an operation to designate lines among a plurality of lines via a pointing device for accepting an instruction to change the display state of the plurality of lines and outputting the instruction to the display control unit 113, and outputs the instruction to a designation unit 1701. The information processing apparatus 100 includes the designation unit 1701 in addition to the configuration of the first exemplary embodiment. The designation unit 1701 analyzes the operation accepted by the acceptance unit 111 or information indicating the display range of the display device 107 obtained from the display control unit 113, and narrows down target lines for the assignment unit 112 to assign the display state change order to among the plurality of lines.

Examples of the operation to designate the lines to assign the display state change order to will be described with reference to FIG. 3C. In FIG. 3C, a cursor 315 indicates the operation position of the pointing device the user is operating. The cursor 315 here designates a position 317 on the coordinate system with the point 318 as the point of origin. The acceptance unit 111 accepts the designation of position information, and outputs the position information to the designation unit 1701. The user may drag the cursor 315 to define a rectangle 316 by operating the pointing device. The acceptance unit 111 can also accept such an operation and output information indicating the defined rectangular area to the designation unit 1701. The information indicating the rectangular area defined by the user operation can also be output to the display control unit 113 and reflected on the display on the display device 107.

The designation unit 1701 obtains the line information table read from the line information storage unit 115 from the acquisition unit 114. Based on the position information or the information about the rectangular area obtained from the acceptance unit 111, the designation unit 1701 identifies lines to be processed by the assignment unit 112 among the lines defined in the line information table. The designation unit 1701 outputs a list of identified lines to the assignment unit 112.

An example of how the lines to be processed by the assignment unit 112 are selected based on the position information or the rectangular area designated by the user operation will be described. In the first modification, the user's objective is to check the connecting points where the lines connect to each other. Designating position information about a point means that the user is paying attention to a connecting point lying near the point. Defining a rectangle means that the user is paying attention to connecting points within the rectangle. The designation unit 1701 thus identifies lines related to the connecting point(s) of interest as ones to be processed by the assignment unit 112.

In the example of FIG. 3C, based on the designation of the position 317, the designation unit 1701 identifies the line 302 near the position 317 as a target line from the line information table, and identifies the line 301 connecting to the line 302 near the position 317 as a target line as well. Rules may be defined to also identify the lines 305 and 307 connecting to the line 301, and even the lines 303 and 304 connecting to the line 305, as target lines in addition to the lines 302 and 301. In such a manner, if a line or connecting point is designated, lines related thereto are identified as processing targets in a propagative manner. This can reduce the number of user operations to designate processing targets for load reduction. If the rectangle 316 is defined, the designation unit 1701 searches the position information about the control points stored in the line information table for lines belonging to the rectangle 316 based on the information indicating the rectangle 316. As a result of the search, the designation unit 1701 designates the line 307 and the line 301 connecting to the line 307 as the lines to change the display state of. If the processing targets are narrowed to within the display range of the display device 107, lines can be selected in a similar manner to when a rectangular area is defined.

The designation unit 1701 outputs the information about the lines identified as described above to the assignment unit 112 in a list form, for example. When reading information about lines from the line information table, the assignment unit 112 reads only the information about the lines included in the list of lines obtained from the designation unit 1701. As a result, the assignment unit 112 can assign the display state change order to only the lines designated by the designation unit 1701. Such a first modification enables the user to check the connection state of only the freely designated lines among the plurality of lines. This can reduce the time needed for the operation for checking the connection state, for example, even when there are a large number of lines representing cracks.

As described in the first exemplary embodiment, the assignment unit 112 groups a plurality of lines expressing a defect occurring in a structure into groups each including a different plurality of lines connecting at a connecting point. In the first exemplary embodiment, such groups are associated with respective different display state change orders. However, identification information other than order may be assigned to the lines as long as a plurality of lines connecting at a connecting point is visually discriminable from each other. A second modification describes another example where a plurality of lines connecting at a single connecting point is assigned respective different pieces of identification information and the display state of the plurality of lines is changed at least part by part based on the identification information.

For example, the assignment unit 112 assigns line color information as the identification information instead of the display state change order. A plurality of lines connecting at a connecting point is assigned respective different colors. When the acceptance unit 111 accepts an instruction to change the display state of the plurality of lines, the plurality of lines is changed to different colors at least part by part and displayed on the display device 107 based on the assigned color information. The display state of all the lines may be changed at the same timing. Since a plurality of lines connecting at a connecting point have respective different colors, the user can easily discriminate a crack extending across the connecting point from a crack ending at the connecting point.

Additional information, such as a crack width, may be expressed in color in an initial state before the acceptance of an instruction to change the display state. In such a case, that an instruction to change the display state has been given can be explicitly displayed on the display device 107 so that the colors will not be confused with those changed according to the second modification. In the second modification, the identification information assigned by the assignment unit 112 is not limited to line color. For example, brightness values or thicknesses can be used. Line representations less likely to be confused with those of other functions may be selected, including the display state change order described in the first exemplary embodiment. When combined with the first modification of the first exemplary embodiment, the processing of the second modification can be applied to some of the plurality of lines.

In a second exemplary embodiment, an example in which the display state of a plurality of lines constituting a connecting point is changed at different timings and the display state change order to change the display state of all the lines is assigned in a stochastically smaller number of times compared to the first exemplary embodiment will be described. In the second exemplary embodiment, a description similar to what has already been described in the first exemplary embodiment will be omitted as appropriate, and differences will be described. In the drawings, elements common to those of the first exemplary embodiment are designated by the same reference numerals.

A configuration of an information processing apparatus 100 according to the second exemplary embodiment is different from that of the first exemplary embodiment in the software configuration of the assignment unit 112. The assignment unit 112 according to the present exemplary embodiment refers to the line information table and venerates a table expressing connections between lines. Such a table will hereinafter be referred to as a connecting line table. FIG. 11A is a diagram illustrating a connecting line table generated by the assignment unit 112. A column 1108 of the connecting line table stores line IDs. A column 1109 stores information about the line IDs of lines constituting a connecting point with the lines having the respective line IDs in the column 1108. Each record of the connecting line table indicates a correspondence between a line and other lines connecting to the line. The line IDs set in the column 1108 are IDs that can uniquely identify the lines stored in the connecting line table. The same line IDs as those in the line information table are used. The line IDs are also used to store the information about the lines connecting to the lines of the respective records in the column 1109.

A record 1101 illustrated in FIG. 11A indicates that the line having a line ID of "L1" is in contact with each of the lines having a line ID of "L2", "L5", and "L7". The lines having a line ID of "L1", "L2", "L5", and "L7" correspond to the lines 301, 302, 305, and 307 of FIG. 3A, respectively.

Figure 12:
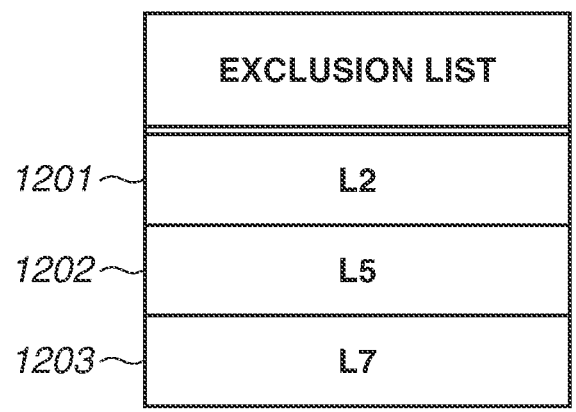
FIG. 12 is a diagram illustrating an example of an exclusion list.

In the second exemplary embodiment, the assignment unit 112 generates an exclusion list. The exclusion list stores data that the assignment unit 112 temporarily uses to not assign the same display state change order to a plurality of lines constituting a connecting point. FIG. 12 illustrates an example of the exclusion list. In the present exemplary embodiment, the exclusion list is a one-dimensional variable-length list. The elements for the exclusion list to store as records are the line IDs of lines to be temporarily excluded from the targets of the assignment processing of the display state change order. Details of the processing using the exclusion list will be described with reference to a flowchart.

The assignment unit 112 further generates a connecting line table and an order table by using the line information table read from the line information storage unit 115 by the acquisition unit 114 as an input. The assignment unit 112 then assigns the display state change order to the lines by temporarily using the exclusion list, and stores the assigned display state change order in the order table.

Figure 13:
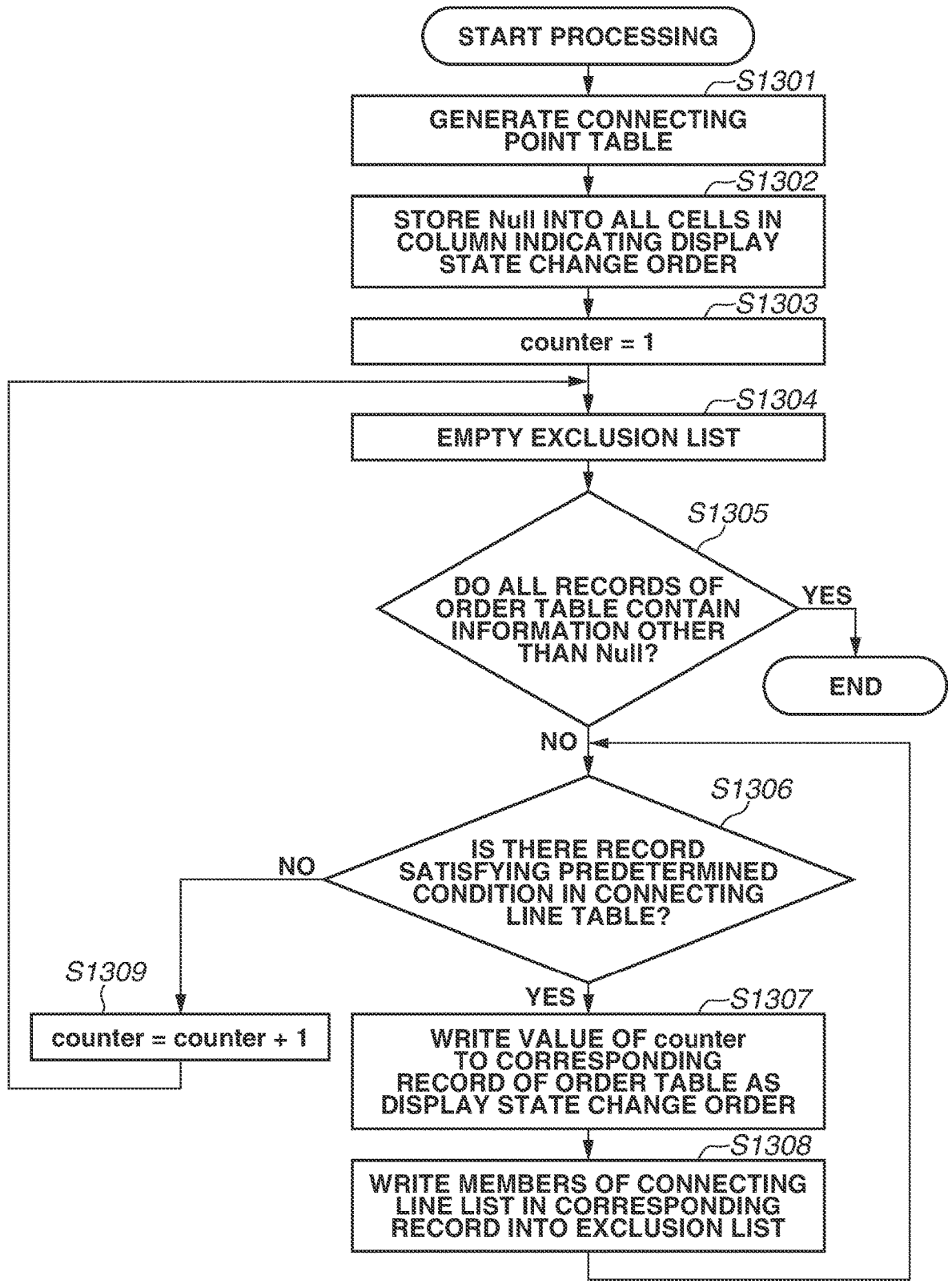
FIG. 13 is a flowchart illustrating an example of processing for assigning the display state change order.

Main processing performed by the information processing apparatus 100 according to the present exemplary embodiment is different from that of the first exemplary embodiment in the details of the processing for assigning the display state change order in S701 of FIG. 7. A description of similarities will be omitted, and the processing of S701 will be described here. FIG. 13 is a flowchart illustrating an example of the processing for assigning the display state change order (S701) according to the present exemplary embodiment.

In S1301, the assignment unit 112 determines a relationship between lines by using the line information table of FIG. 2A and generates the connecting line table of FIG. 11A. In S1302, like an order table illustrated in FIG. 5C, the assignment unit 112 stores "Null" in all the cells in the column 509 indicating the display state change order. In S1303, the assignment unit 112 substitutes 1 into a variable "counter" used for assignment. In S1304, the assignment unit 112 empties the exclusion list.

In S1305 the assignment unit 112 determines whether all the records of the order table contain information other than Null. If all the records contain information other than Null (YES in S1305), the processing for assigning the display state change order ends, and the processing proceeds to S702 of FIG. 7. On the other hand, if all the records do not contain information other than Null, i.e., there still is a record or records containing Null (NO in S1305), the processing proceeds to S1306.

In S1306, the assignment unit 112 determines whether there is a record satisfying a predetermined condition in the connecting line table. A record satisfying a predetermined condition refers to one satisfying all the following conditions (1) to (3): (1) The line ID is not included in the exclusion list. (2) In the order table, the display state change order corresponding to the line ID is Null. (3) The record comes first when records containing a largest number of members (number of line IDs) in the connecting line lists of the column 1109 are sorted in ascending order of the line IDs in the column 1108.

The processing of S1306 will be described by using a specific example. For example, suppose that the connecting line table is in the state illustrated in FIG. 11A, the exclusion list is empty, and the order table is in the state illustrated in FIG. 5C. From the condition (1), all the records of the connecting line table are candidates for the record satisfying the predetermined condition since the exclusion table is empty. All the cells in the column 509 of the order table illustrated in FIG. 5C are Null. From the condition (2), all the records of the connecting line table are candidates for the record satisfying the predetermined condition. Referring to the connection table illustrated in FIG. 11A, the assignment unit 112 then determines the record that contains the largest number of members in the connecting line lists of the column 1109 and comes first when sorted in ascending order of the line IDs in the column 1108. The largest number of members stored in the connecting line lists of the column 1109 is three, which is in the records 1101 and 1105. Of the two records, the record 1101 with the line ID of "L1" satisfies the condition (3).

In S1307, the assignment unit 112 writes the value of counter to the column 509 as a display state change order of the record satisfying the predetermined condition in the order table, identified in S1306. In the example where the record 1101 with the line ID of "L1" is determined to satisfy the predetermined condition in S1306, the value of counter, 1, is written to the display state change order (column 509) of the record 501 corresponding to the line having the line ID of "L1" in the order table. In S1308, the assignment unit 112 writes the members of the connecting line list in the record determined to satisfy the predetermined condition in S1306 into the exclusion list. For example, if the record of the connecting line table determined to satisfy the predetermined condition is the record 1101 in FIG. 11A and the exclusion list is empty so far, the line IDs "L2", "L5", and "L7" are stored in the exclusion list as illustrated in FIG. 12. The processing then returns to S1306.

In the specific example described above, the exclusion list is updated by the processing of S1303, and thus the target records of determination whether to satisfy the condition (3) in S1306 are the remaining ones with the line IDs of "L3", "L4", and "L6". Since the numbers of members in the records 1103 and 1104 of the column 1109 are two, the record 1103 with the line ID of "L3" is the record satisfying the predetermined condition. In S1307, the assignment unit 112 writes the value of counter, 1, to the display state change order (column 509) in the record of the line having the line ID of "L3" in the order table. In S1308, the line IDs "L4" and "L5" stored in the column 1109 of the record 1103 of the connecting line table are added to the exclusion list. When S1306 is performed next time, the record 1106 with the line ID of "L6" is determined to be the one satisfying the predetermined condition by similar processing, and the display state change order for the line ID of "L6" is changed to 1. Since all the lines of which the display state change order is Null are included in the exclusion list, the determination of S1306 next time is NO (NO in S1306) and the processing proceeds to S1309.

In S1309, the assignment unit 112 adds 1 to the current value of counter and substitutes the sum into counter. The processing returns to S1304. In the foregoing example, the order table illustrated in FIG. 5D is obtained as a result of repeating the processing of S1304 to S1309. In the order table of FIG. 5D, like FIG. 5B described in the first exemplary embodiment, a plurality of lines connecting at a connecting point is assigned display state change order such that the display state is changed at different timings.

Figure 14:
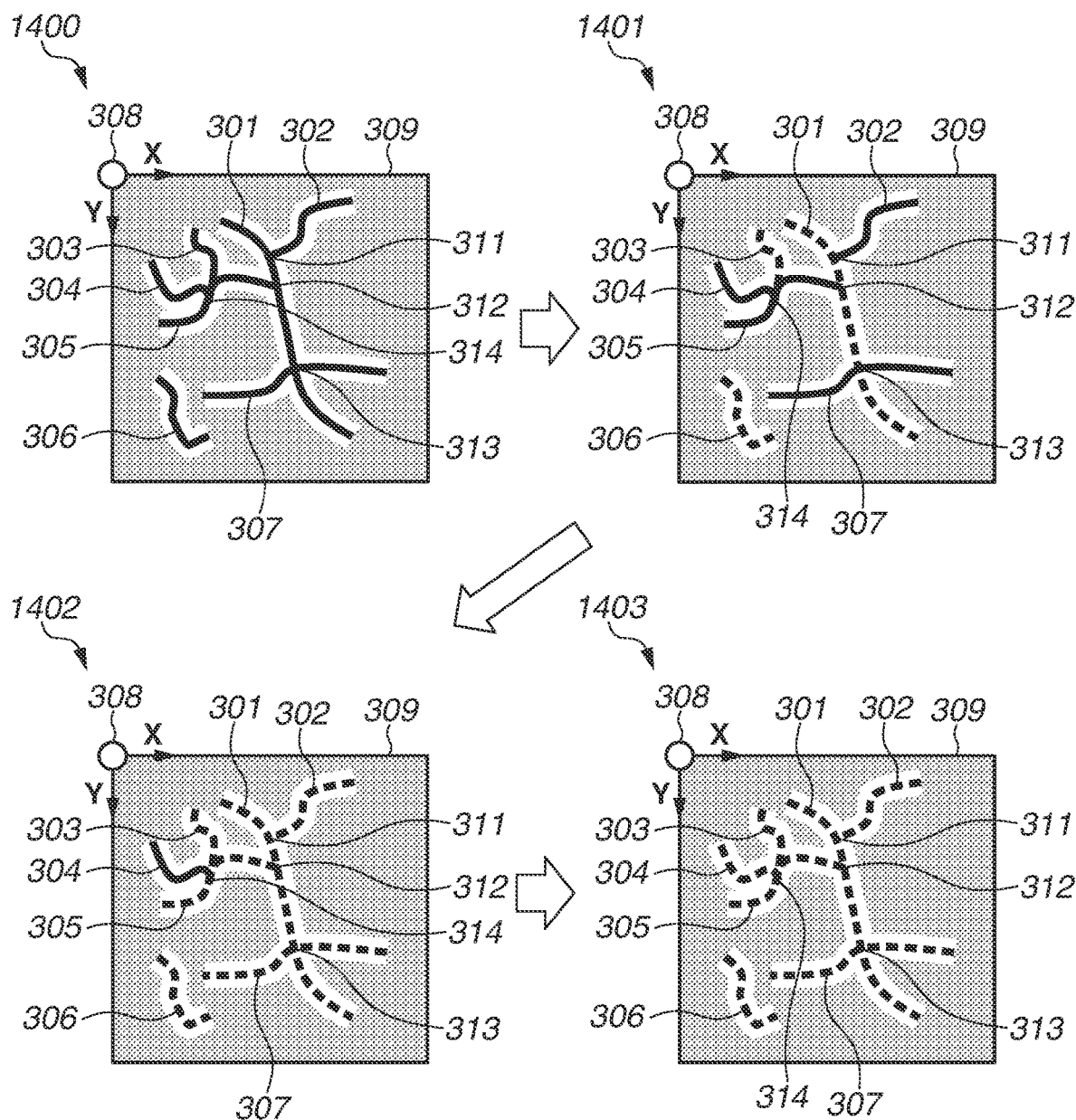
FIG. 14 is a diagram illustrating a case where the display state of lines is changed from solid lines to dotted lines based on the display state change order.

FIG. 14 is a diagram illustrating an example of how the display state of the plurality of lines is changed stepwise by the display control unit 113 based on the order table illustrated in FIG. 5D. Again, in the example of FIG. 14, instructions to change the display state are ones to switch the display state of the lines from solid lines to dotted lines. Similar elements to those described in FIGS. 3A to 3D are designated by the same reference numerals as in FIGS. 3A to 3D.

A display state 1400 is the same state as that of FIG. 3A. The plurality of lines 301 to 307 is displayed on the background image 309 in a superimposed manner based on the information stored in the line information table of FIG. 2A. When the acceptance unit 111 accepts the first instruction to change the display state, the display on the display device 107 transitions from the display state 1400 to a display state 1401. In the display state 1401, the display state of the lines 301, 303, and 306 corresponding to the records containing 1 in the column 509 in FIG. 5D (with line IDs of "L1", "L3", and "L6") is changed from solid lines to dotted lines. When the acceptance unit 111 accepts the second instruction to change the display state, the display on the display device 107 transitions from the display state 1401 to a display state 1402. Here, the display state of the lines 302, 305, and 307 corresponding to the records containing order of 2 in the order table of FIG. 5D (with line IDs of "L2", "L5", and "L7") is changed from solid lines to dotted lines.

The change of the lines 302, 305, and 307 from solid lines to dotted lines in the display state 1402 enables the user to check the state of the lines (cracks) detected around the connecting points 311, 312 and 313 by comparison with the display state 1401. When the acceptance unit 111 further accepts the third instruction to change the display state, the display transitions to a display state 1403. In the display state 1403, the line 304 having display state change order of 3 is changed from a sold line to a dotted line. The changes of the lines 305 and 304 from a solid line to a dotted line in the display states 1402 and 1403, respectively, enables the user to check the state of the lines (cracks) detected around the connecting point 314 by comparison with the display state 1401.

As described above, according to the present exemplary embodiment, the state of the connecting points can also be efficiently checked, compared to the conventional method. In particular, in the second exemplary embodiment, the value of one variable "counter" is assigned to all applicable lines by repeating the processing of S1306 to S1309. The display state change order can thereby be assigned to all the lines with the numerical value of counter being kept stochastically low, compared to the first exemplary embodiment. Keeping the numerical value of counter low enables the user to recognize the connections of the lines by a smaller number of times of switching of the display state.

Consequently, in a case of using the same line information table of FIG. 2A, the number of times of switching of display according to the first exemplary embodiment is four, whereas the number of times of switching of display according to the present exemplary embodiment is three, i.e., smaller than in the first exemplary embodiment. In the second exemplary embodiment, the display state of all the lines can be changed by a stochastically smaller number of times than in the first exemplary embodiment, while the display state of a plurality of lines constituting a connecting point is controlled to change at different timings. This can reduce the time needed for the operation for checking the connection state even when there are a large number of lines representing cracks. If the time needed for the user to switch display is the same, the connection state of the lines can be identified in a shorter time than by the switching of display according to the first exemplary embodiment.

In the second exemplary embodiment, a record containing a largest number of members in the connecting line list is identified from the records of the connecting line table by the processing of S1306. Lines connecting to many lines are thus assigned earlier display state change order by priority. This provides the following effect. It is known that human memory characteristically has a serial position effect, and if pieces of information are presented in succession, the pieces presented at the beginning and at the end are particularly likely to be remembered. Cracks represented by lines connecting to many lines are likely to be ones contributing to the production of other cracks. In other words, such lines are likely to represent cracks of high importance. In the second exemplary embodiment, lines connecting to many lines are therefore assigned earlier display state change order by priority, whereby important lines can be made likely to be remembered by the user who makes the checking operation.

Figure 15:
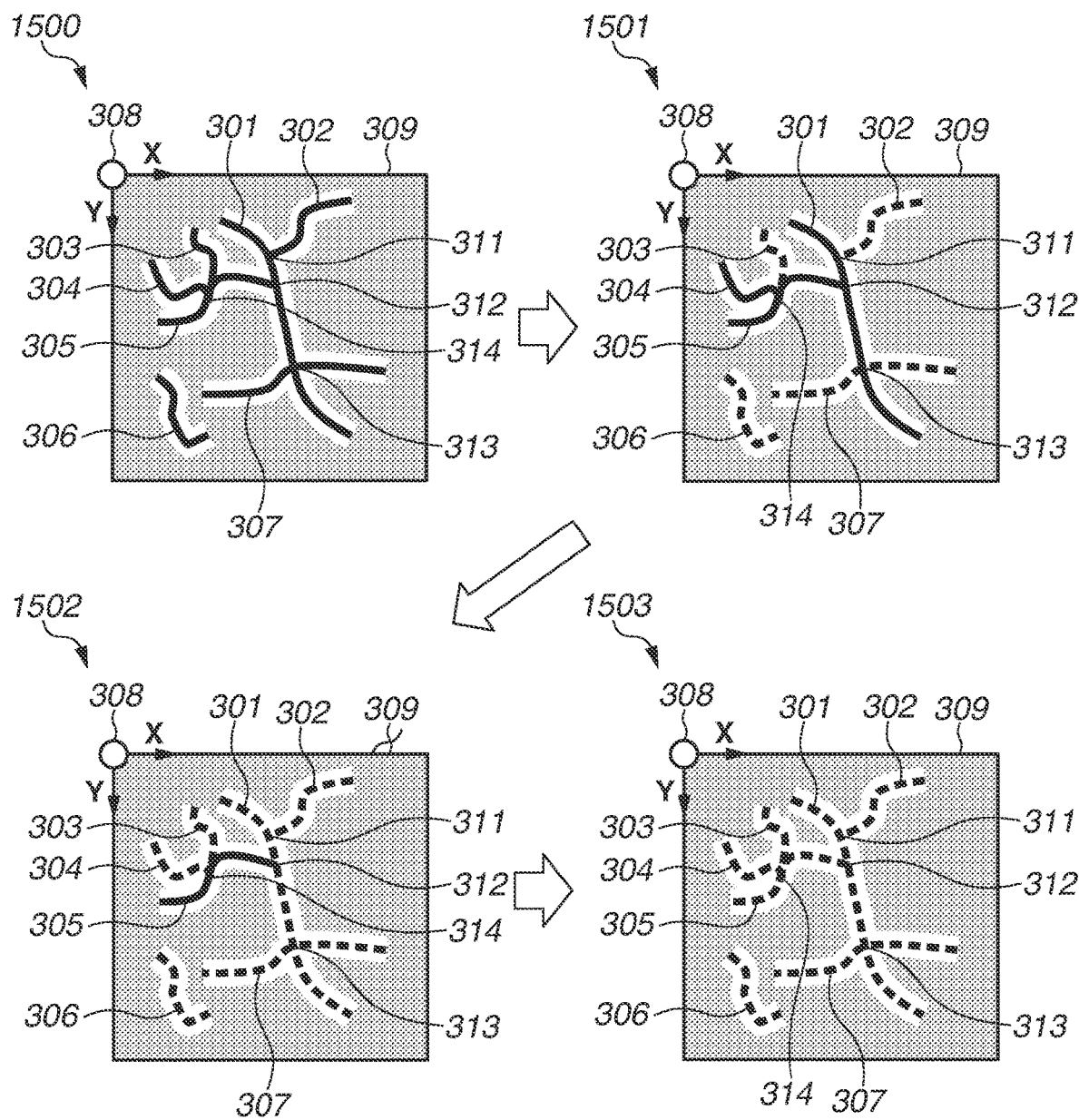
FIG. 15 is a diagram illustrating a case where the display state of lines is changed from solid lines to dotted lines based on the display state change order.

According to the serial position effect described above, important lines can also be made likely to be remembered by assigning later display state change order to lines of which the number of members in the connecting line list in the connecting line table is the largest. Such assignment can be implemented by searching for lines of which the number of line IDs in the connecting line list in the connecting line table is the smallest in the processing of S1306. FIG. 6A illustrates the resulting order table. If, in the processing of S705 in FIG. 7, the display control unit 113 reads the order table of FIG. 6A and changes the display state of the lines, the resulting display transitions from a display state 1500 of FIG. 15 to display states 1501, 1502, and 1503. A comparison between FIGS. 14 and 15 shows that the display state of lines connecting to many lines is changed at later timing. For example, the display state of the line 301 is changed in response to the second instruction (transition from the display state 1501 to the display state 1502). The display state of the line 305 is changed in response to the third instruction (transition from the display state 1502 to the display state 1503).

As another method for giving later display state change order to the lines of which the number of members in the connecting line list in the connecting line table is the largest by priority, the display state of the lines may be changed in reverse order to that of FIG. 5D. Specifically, the display state of the lines can be changed and displayed in order of 3, 2, 1 in terms of the numerical values in the column 509.

The first and second exemplary embodiments may be implemented by the same information processing apparatus 100 in a switching manner depending on the user's setting.

A modification in which the display state change order is assigned to each of a plurality of lines in consideration of differences between the display states (appearances) of the lines before an instruction to change the display state of the lines is accepted will be described. In the modification, a description of similarities to what has already been described in the second exemplary embodiment will be omitted as appropriate, and differences will be described. In the drawings, elements common to those of the first exemplary embodiment are designated by the same reference numerals.

A configuration of an information processing apparatus 100 according to a modification of the second exemplary embodiment is different from those of the first and second exemplary embodiments in the software configuration of the assignment unit 112. If the plurality of lines drawn based on the line information table includes a line having a display state different from that of the others and the state of connection is easily recognizable to the user by sight due to the difference in the display state, the assignment unit 112 according to the modification assigns a display state change order by taking account of the difference. Specifically, the assignment unit 112 can clearly exceptionally assign the line the same display state change order as that of another line with which the line constitutes a connecting point.

FIG. 3D illustrates an example where the state of connection between a line having a display state different from other lines and the other lines is easily recognizable to the user by sight due to a difference in the display state of the lines. In FIG. 3D, the display state of the line 305 is a thick solid line, which is different from the display state of the other lines. For example, it is clear to the user that the line 305 is a line continuous across the connecting point 314. The time needed for the checking operation is therefore less likely to be excessive if the display state of the line 305 is changed at the same timing as that of at least either one of the lines 303 and 304 connecting to the line 305 at the connecting point 314. A line is given a display state different from that of the others, like the line 305 of FIG. 3D, in situations where not only the positions and shapes of the plurality of lines but also other information is intended to be expressed. For example, the widths of the cracks occurring in the structure can be included in the detection result and can be reflected on the line information. Thicknesses and colors can be set to emphasize particularly important cracks.

In the modification, the information about the plurality of lines representing cracks is managed by using a line information table. The plurality of lines in FIG. 3D is drawn based on the line information table of FIG. 2B. In the line information table of FIG. 2B, the display state in the record 205 is a "thick solid line". In other respects, the line information table of FIG. 2B is the same as that of FIG. 2A used in the first and second exemplary embodiments.

Like the second exemplary embodiment, the information processing apparatus 100 according to the modification operates in accordance with the procedure illustrated in the flowchart of FIG. 13. However, the processing of the assignment unit 112 in S1301 is different from that in the second exemplary embodiment. A description of similarities will be omitted, and the processing of S1301 according to the modification will be described. In S1301, the assignment unit 112 identifies a connection relationship between the lines and generates a connecting line table illustrated in FIG. 11B by using the line information table illustrated in FIG. 2B. In the modification, in identifying the connection relationship between the lines, the assignment unit 112 refers to the column 210 of the line information table. If lines in different display states contact each other at a connecting point, the assignment unit 112 does not write that information into the line information table. In other words, the lines in different display states are treated as not connecting to each other. FIG. 11B illustrates the connecting line table resulting from the processing of S1301 according to the modification, performed based on the line information table illustrated in FIG. 2B. In the connecting line table of FIG. 11B no information about connecting lines is stored in the column 1109 of the record 1105 with the line ID of "L5". "L5" is not included in any of the line IDs stored in the column 1109 of the other records, either.

Figure 16:
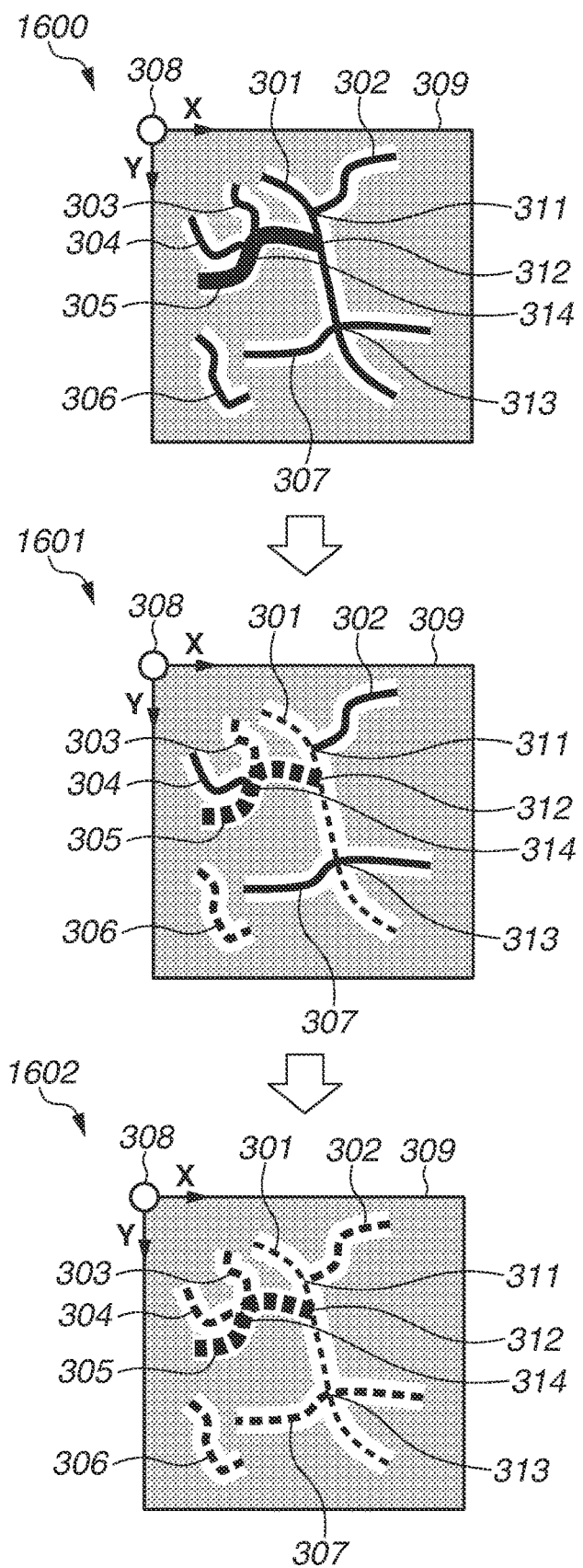
FIG. 16 is a diagram illustrating a case where the display state of lines is changed from solid lines to dotted lines based on the display state change order.

FIG. 6B illustrates the resulting order table generated when the connecting line table of FIG. 11B, generated as described above, is subjected to the subsequent processing of FIG. 13 to assign display state change order. FIG. 16 illustrates an example of the transition of the display state, implemented by the display control unit 113 based on the order table of FIG. 6B when an instruction to change the display state of the plurality of lines is repeatedly accepted.

In FIG. 16, a display state 1600 is the same state as that of FIG. 3D. When the acceptance unit 111 accepts the first instruction to change the display state, the display on the display device 107 transitions from the display state 1600 to a display state 1601. Here, the display state of the line 305 and that of the line 301, and the display state of the line 305 and that of the line 303, change at the same time even though the pairs of lines each contact at a connecting point. Since the remaining lines do not contact another line, the changes of the display state of all the lines are completed by the transition to a display state 1602 based on the second instruction to change the display state.

As described above, according to the modification, the changes of the display state of the plurality of lines to check the connection state between the lines around the connecting points can be completed by an even smaller number of operations than in the second exemplary embodiment. If the time needed for the user to switch display is the same, the connection state of the lines can be identified in a shorter time than by the switching of display according to the second exemplary embodiment. The modification of the second exemplary embodiment can be implemented by the same information processing apparatus 100 as that of the foregoing second or first exemplary embodiment in a switching manner depending on the user's setting.

Like the first exemplary embodiment, the first modification for narrowing down the target lines to assign the display state change order based on user operations and the second modification for changing the display state of the lines by using identification information instead of the display state change order can be applied to the second exemplary embodiment.

According to an exemplary embodiment, a human operation for checking a connection state of crack-representing lines based on a detection result of cracks occurring in a structure can be made efficient.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that the some embodiments are not limited to the disclosed exemplary embodiments. The scope of the following claims is to be accorded the broadest interpretation so as to encompass all such modifications and equivalent structures and functions.

This application claims priority to Japanese Patent Application No. 2018-182087, which was filed on Sep. 27, 2018 and which is hereby incorporated by reference herein in its entirety.

What is claimed is:

1. An apparatus comprising:
at least one processor,
wherein the at least one processor constitutes:
 a display control unit configured to display a plurality of lines representing a plurality of cracks occurring in a structure on a display unit; and
 an assignment unit configured to assign an order in which a display state is changed to each of a plurality of lines constituting one connecting point among the plurality of displayed lines, and
wherein the display control unit is configured to, in a case where the plurality of lines constituting the one connecting point are displayed in a first display state, perform control to change the display state of each of the plurality of lines constituting the one connecting point to a second display state different from the first display state at different timings from each other based on the order assigned by the assignment unit.

2. The apparatus according to claim 1,
wherein the at least one processor further constitutes an acceptance unit configured to accept an instruction to change the display state of the plurality of displayed lines on the display unit, and
wherein the display control unit is configured to change the display state of part of the plurality of displayed lines based on the order assigned by the assignment unit each time the instruction is accepted by the acceptance unit.

3. The apparatus according to claim 1, wherein each of the plurality of displayed lines is a line defined as a result of detection of a defect occurring in the structure by analyzing a captured image of the structure.

4. The apparatus according to claim 1, wherein each of the plurality of displayed lines is a line defined by a user tracing a defect occurring in the structure on a captured image of the structure.

5. The apparatus according to claim 1, wherein the display control unit is configured to display the plurality of displayed lines on the display unit as superimposed on a captured image of the structure.

6. The apparatus according to claim 5,
wherein each of the plurality of displayed lines represents a crack occurring in the structure, and
wherein the connecting point corresponds to a point where the crack branches out.

7. The apparatus according to claim 1, wherein the assignment unit is configured to assign the order based on a number of other lines connecting to each of the plurality of displayed lines.

8. The apparatus according to claim 7, wherein the assignment unit is configured to assign the order to each of the plurality of displayed lines so that a line to which a large number of other lines connect among the plurality of displayed lines comes earlier or later in the order by priority.

9. The apparatus according to claim 1, wherein the assignment unit is configured to assign the order to each of the plurality of lines constituting the one connecting point so that the display state of a line continuous across the one connecting point among the plurality of lines constituting the one connecting point is changed at timing different from that at which the display state of a line ending at the one connecting point is changed.

10. The apparatus according to claim 1, further comprising a designation unit configured to designate a line to assign the order to among the plurality of displayed lines,
wherein the assignment unit is configured to assign the order to the line designated by the designation unit.

11. The apparatus according to claim 10, wherein the designation unit is configured to designate the line to assign the order to based on a display range displayed on the display unit.

12. The apparatus according to claim 11, wherein the designation unit is configured to designate a line specified by a user operation as the line to assign the order to.

13. The apparatus according to claim 10, wherein the designation unit is configured to designate a line near a point defined by a user operation among the plurality of displayed lines as the line to assign the order to based on a position of the point.

14. The apparatus according to claim 13, wherein the designation unit is configured to further designate a line connecting to the line near the point among the plurality of displayed lines as a line to assign the order to.

15. The apparatus according to claim 10, wherein the designation unit is configured to designate a line belonging to a rectangular area defined by a user operation among the plurality of displayed lines as the line to assign the order to based on the rectangular area.

16. The apparatus according to claim 1,
wherein the acceptance unit is configured to accept an operation for indicating either one of first and second opposite directions by a predetermined operation unit as the instruction, and
wherein the display control unit is configured to, if the first direction is indicated, change the display state of each of the plurality of lines constituting the one connecting point in the order assigned by the assignment unit, and if the second direction is indicated, change the display state of each of the plurality of lines constituting the one connecting point in order reverse to the order.

17. The apparatus according to claim 1,
wherein the at least one processor further constitutes an acceptance unit configured to accept an instruction to change the display state of the plurality of displayed lines on the display unit;
wherein the display control unit is configured to repeat control to change the display state of part of the plurality of displayed lines based on the order assigned by the assignment unit at predetermined time intervals in response to the acceptance of the instruction by the acceptance unit.

18. The apparatus according to claim 1,
wherein, in the first display state, the plurality of lines constituting the one connecting point are displayed as solid lines, and
wherein, in the second display state, the plurality of lines constituting the one connecting point are displayed as wavy lines, lines of a different color from the first display state, lines of a different thickness from the first display state, or lines of a different transparency from the first display state.

19. A method for processing information, comprising:

displaying a plurality of lines representing a plurality of cracks occurring in a structure on a display unit;

assigning an order in which a display state is changed to each of a plurality of lines constituting one connecting point among the plurality of displayed lines;

changing a display state of each of the plurality of lines constituting the one connecting point from a first display state to a second display state different from the first display state at different timings from each other based on the order assigned by the assigning.

20. A non-transitory computer-readable medium having a computer program stored thereon to perform a method for processing information implemented by a processor, the method comprising:

displaying a plurality of lines representing a plurality of cracks occurring in a structure on a display unit;

assigning an order in which a display state is changed to each of a plurality of lines constituting one connecting point among the plurality of displayed lines; and changing a display state of each of the plurality of lines constituting the one connecting point from a first display state to a second display state different from the first display state at different timings from each other based on the order assigned by the assigning.

\* \* \* \* \*